United States Patent
Brown et al.

[11] Patent Number: 5,657,626
[45] Date of Patent: Aug. 19, 1997

[54] EXHAUST SYSTEM WITH A NEGATIVE FLOW FLUIDICS APPARATUS

[75] Inventors: Jacqueline L. Brown; William Hertl, both of Corning; Thomas D. Ketcham, Big Flats; Mallanagouda D. Patil, Corning, all of N.Y.

[73] Assignee: Corning Incorporated, Corning, N.Y.

[21] Appl. No.: 578,003

[22] Filed: Dec. 22, 1995

[51] Int. Cl.$^6$ .......................................... F01N 3/28
[52] U.S. Cl. .................... 60/274; 55/309; 55/DIG. 30; 60/288; 60/303; 60/311
[58] Field of Search .............................. 60/274, 288, 311, 60/303; 422/180; 55/DIG. 30, 309

[56] References Cited

U.S. PATENT DOCUMENTS

| | | |
|---|---|---|
| 3,144,309 | 8/1964 | Sparrow . |
| 3,783,619 | 1/1974 | Alquist . |
| 3,844,119 | 10/1974 | Herrbrich ........................ 60/288 |
| 3,988,890 | 11/1976 | Abthoff et al. . |
| 3,995,423 | 12/1976 | Aoki et al. . |
| 4,023,360 | 5/1977 | Wössner et al. . |
| 5,067,319 | 11/1991 | Moser ............................... 60/288 |
| 5,277,026 | 1/1994 | Boll .................................. 60/288 |
| 5,345,762 | 9/1994 | Lutze ............................... 60/288 |
| 5,347,309 | 9/1994 | Moeckel .......................... 60/303 |
| 5,398,503 | 3/1995 | Danno ............................. 60/288 |
| 5,449,499 | 9/1995 | Bauer et al. . |

FOREIGN PATENT DOCUMENTS

| | | |
|---|---|---|
| 0 661 098 A2 | 12/1994 | European Pat. Off. . |
| 1275772 | 5/1972 | United Kingdom . |
| 2 240 486 | 8/1991 | United Kingdom . |
| 95/18292 | 7/1995 | WIPO . |

OTHER PUBLICATIONS

Appln. No. 08/484,617; Filed Jun. 8, 1995; "In-Line Adsorber System".
Appln. No. 08/375,699; Filed Jan. 19, 1995; "By-Pass Adsorber System".

*Primary Examiner*—Douglas Hart
*Attorney, Agent, or Firm*—Timothy M. Schaeberle

[57] ABSTRACT

The present invention is directed to an in-line engine exhaust system. In general, the exhaust system is comprised of the following: (1) a honeycomb structure having an inlet and outlet end disposed in a housing and located in an exhaust gas stream downstream from an engine and possessing a first substantially unobstructed flow region, a second more obstructed flow region adjacent the first region; and, (2) a fluidics apparatus disposed in the exhaust stream proximate to the first region for creating a negative flow zone within the first region, which in turn results in diverting a portion of the exhaust gases away from the first region. More specifically, the fluidics apparatus includes a source diversion fluid, typically air, a conduit for delivering the diversion fluid and a diverter body for diverting the diversion fluid.

19 Claims, 10 Drawing Sheets

EXHAUST SYSTEM WITH A NEGATIVE FLOW FLUIDICS APPARATUS

The invention relates to an improved exhaust system, and more particularly to a honeycomb structure possessing a first substantially unobstructed flow region, a second more obstructed flow region adjacent the first region and a fluidics apparatus for creating a negative flow zone in the first region.

BACKGROUND OF THE INVENTION

While catalytic converters are well known for reducing oxides of nitrogen (NOx), and oxidizing hydrocarbons and carbon monoxide from automobile exhaust, these reactions typically take place after the catalyst has attained its light-off temperature, at which point the catalyst begins to convert the hydrocarbons to harmless gases. The typical catalytic light-off time for most internal combustion engine systems is around 50 to 120 seconds (generally in the temperature range of 200°–350° C.); with the actual catalytic light-off time for any system depending on a number of factors, including, the position of the catalyst relative to the engine, the aging of the catalyst, as well as the noble metal loading. Seventy to eighty percent of hydrocarbon emissions from automotive vehicles are emitted during this first minute, or so, of "cold start" engine operation, i.e., without additional measures large amounts of hydrocarbons are likely to be discharged into the atmosphere during this period. The problem is made worse by the fact that the engines require rich fuel-air ratios to operate during cold-start thus, increasing even further the amount of unburned hydrocarbons discharged. Environmentally, increasing the effectiveness of automotive emission control systems during cold start, so that the amount of hydrocarbons discharged into the atmosphere during cold-start are kept at extremely low levels, has become increasingly important.

Various schemes have been proposed for meeting the stringent hydrocarbon emission standards during cold start including, the use of electrically heated catalysts (EHCs) to reduce the light-off time of the main catalyst, the use of molecular sieve structures (hydrocarbon adsorbers) to adsorb and hold significant amounts of hydrocarbons until the converter has attained its light-off temperature, as well as combinations of both.

Recently, improved in-line and by-pass exhaust control systems respectively have been disclosed in, co-assigned U.S. applications Ser. No. 08/375,699 (Guile et al.) and U.S. Ser. No. 08/484,617 (Heft et al.); both herein incorporated by reference. The Guile reference discloses a by-pass adsorber system wherein flow patterns from a secondary air source are used to direct exhaust gas flow to and away from the adsorber during cold-start.

Hertl discloses an in-line exhaust system having a main catalyst, a housing downstream of the main catalyst having an inlet and an outlet end, and having disposed therein a molecular sieve structure for adsorbing hydrocarbons. The molecular sieve structure exhibits (1) a first region forming an unobstructed or substantially unobstructed flow path for exhaust gases of an exhaust stream; and, (2) a second, more restricted flow path, region adjacent the first region. Furthermore, Hertl's exhaust system includes a burn-off catalyst disposed downstream from the adsorber having a light-off temperature. Lastly, the system includes a diverting means disposed in the housing for passing secondary air to the molecular sieve structure; the flow pattern of the secondary air directs a major portion of the exhaust gases of the exhaust stream through the second region of the adsorber prior to the main catalyst attaining its light-off temperature.

Environmental concerns and legislation drafted to meet those concerns continues to lower legally acceptable hydrocarbon emission standards, e.g., the California ultra-low emission vehicle (ULEV) standards. Notwithstanding the fact that the Hertl system outperformed earlier exhaust systems, there thus continues to be a need for improvements to existing systems and for new systems capable of meeting these stricter exhaust emission standards.

SUMMARY OF THE INVENTION

Accordingly, the present invention is directed at an exhaust system comprised of the following: (1) a honeycomb structure having an inlet and outlet end disposed in a housing and located in an exhaust gas stream downstream from an engine and possessing a first substantially unobstructed flow region, a second more obstructed flow region adjacent the first region; and, (2) a fluidics apparatus system disposed in the exhaust stream, preferably, proximate the first region for creating a negative flow zone within the first region. More specifically, the fluidics apparatus includes a diverter body, a diversion fluid source and a conduit possessing an outlet for directing the diversion fluid toward the diverter body; resulting in the flow in the first region being in a direction opposite that of the upstream exhaust gas flow and a diversion of the exhaust gas away from the first flow region toward the second flow region Stated another way, the invention is directed at an exhaust system which utilizes a fluidics diverter system that creates zone of negative flow in the exhaust system, e.g., flow in the central hole of a honeycomb structure which is in the opposite direction of that flow of exhaust gases upstream of the honeycomb structure.

One advantage of this negative flow system, is that this fluidics diverted exhaust system can be incorporated into an overall in-line exhaust system wherein the honeycomb structure is an adsorber located in an exhaust stream between a lightoff catalyst and a burnoff catalyst. The negative flow created by the fluidics apparatus ensures that most of the unwanted hydrocarbons which, in previous systems were allowed to escape into the atmosphere during the first few minutes of "cold start", will have at least one pass through an adsorber, thereby enhancing adsorption and ultimately reducing hydrocarbon emissions. Experimentally, it has been demonstrated that the negative flow can improve the non-methane hydrocarbon adsorption efficiency by 10–30% in these types of in-line systems.

DETAILED DESCRIPTION OF THE INVENTION

Figure 1:
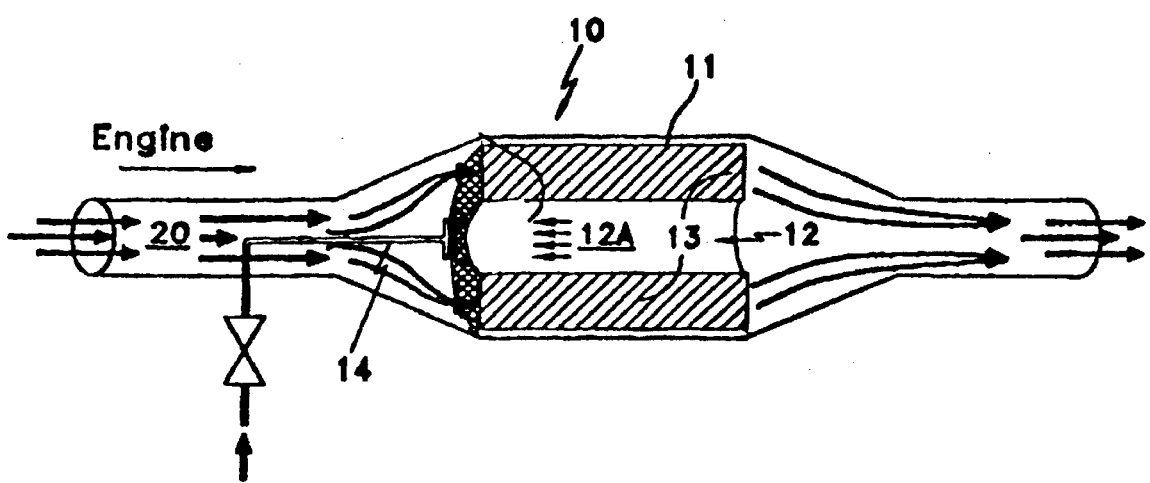
FIG. 1 is sectional (longitudinal) view of the invention showing an exhaust system in which exhaust gas flows from the engine to the honeycomb structure.

Referring now to FIG. 1, depicted therein is a honeycomb structure 11 having an inlet and outlet end disposed in a housing 10 and located in an exhaust gas stream downstream from an engine (not shown). The honeycomb structure possesses a first substantially unobstructed flow or low flow resistance region 12, and a second more obstructed flow region 13 adjacent the first region; the first region being disposed to provide a substantially unobstructed flow path for the exhaust gases of the exhaust gas stream. A fluidics apparatus 14 is disposed in the housing 10 proximate to the inlet of the first flow region 12 and functions to create a zone 12A of negative flow, which in turn is partly responsible for diverting a portion of the exhaust gases away from the first region.

Figure 2:
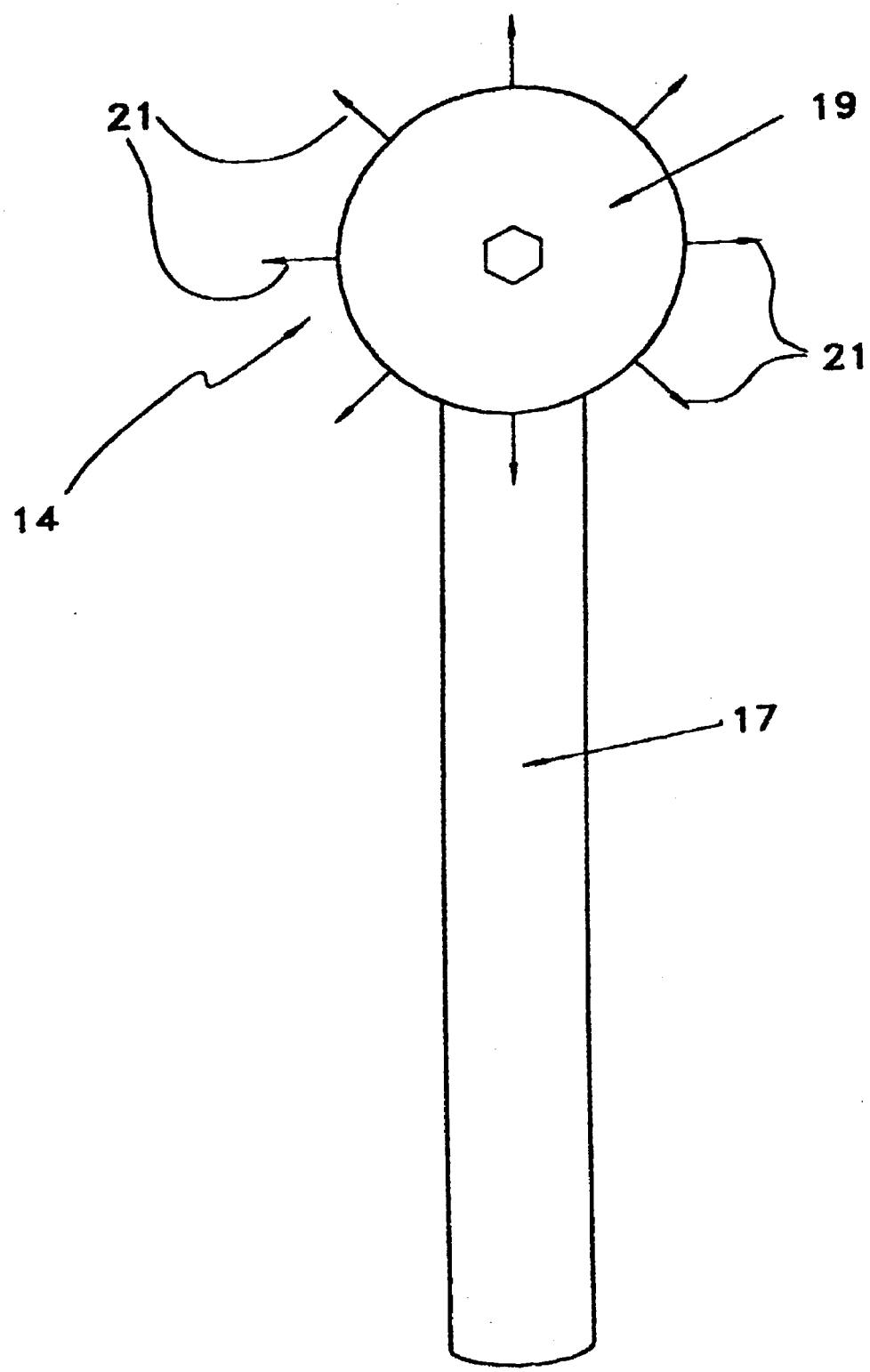
FIG. 2 is a front view of one embodiment of a flow diverter utilized in the inventive exhaust system.
Figure 2A:
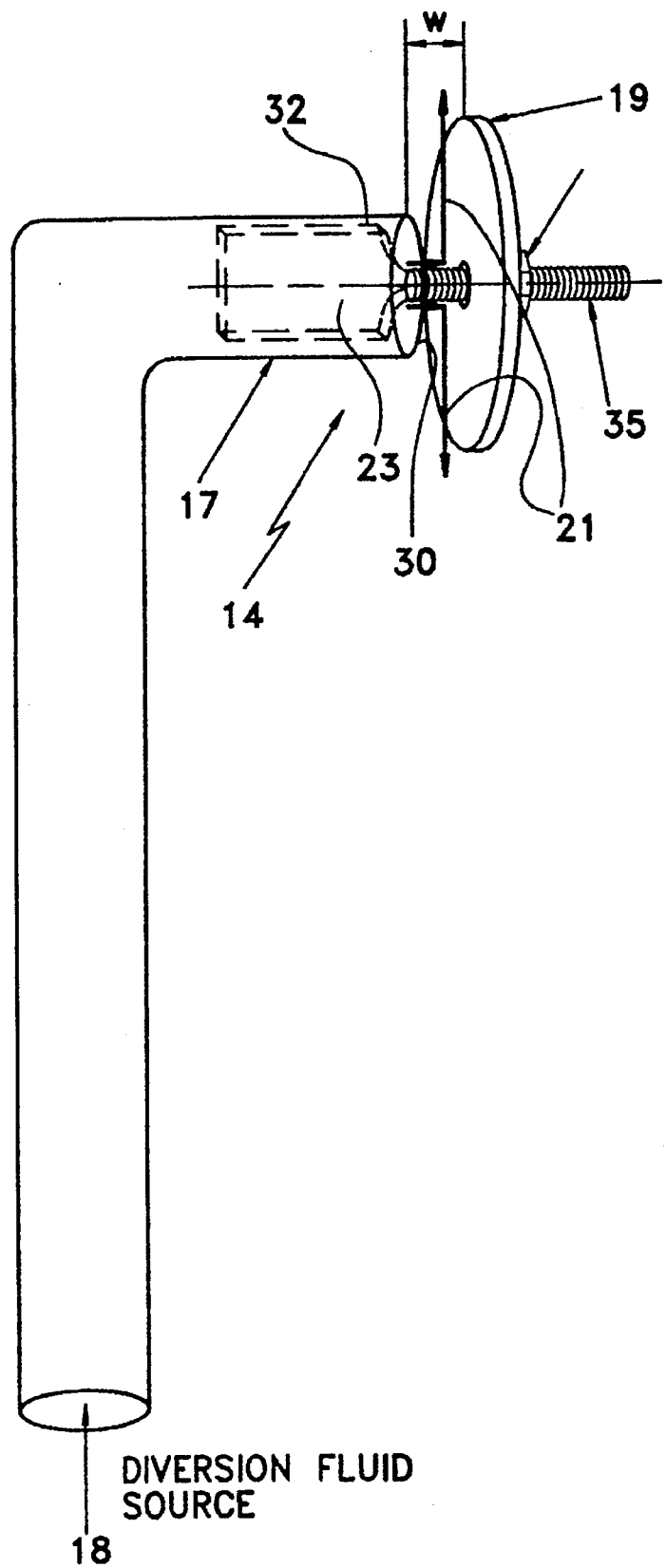
FIG. 2A is a side view of the same flow diverter as depicted in FIG. 2.

Referring now to FIGS. 2 and 2A depicted therein is one embodiment, two views, of a fluidics apparatus 14 suitable for use in the exhaust system described herein; the apparatus includes a diverter body 19, a diversion fluid source (not shown) and a conduit 17 possessing an outlet 30 for directing the diversion fluid toward the diverter body 19. Specifically, the diverter body 19 is positioned, a variable slot distance W, in from of the outlet 30 of diversion fluid conduit 17, through the use of a diverter support system 32. Conduit outlet 30 is positioned sufficiently close to the diverter body 19 whereby the diverter body 19 imparts a flow component to the diversion fluid which is transverse to the direction of the exhaust flow entering the housing; this flow component indicated by the flow arrows 21 shown. Diverter support system 32 consists of a support member 33 which is secured within the inside circumference of the diversion conduit 17 and a threaded post 35. Diverter 19 is directly attached to threaded post 35 allowing for the slot width to be varied.

Figure 3:
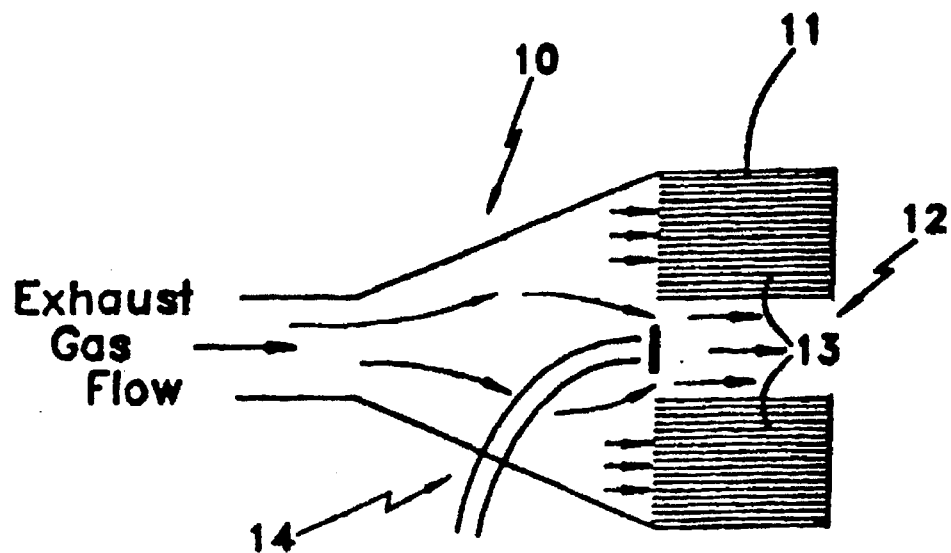
FIG. 3 is a schematic illustrating the direction of undiverted exhaust gas flow through an elliptical honeycomb structure.
Figure 4:
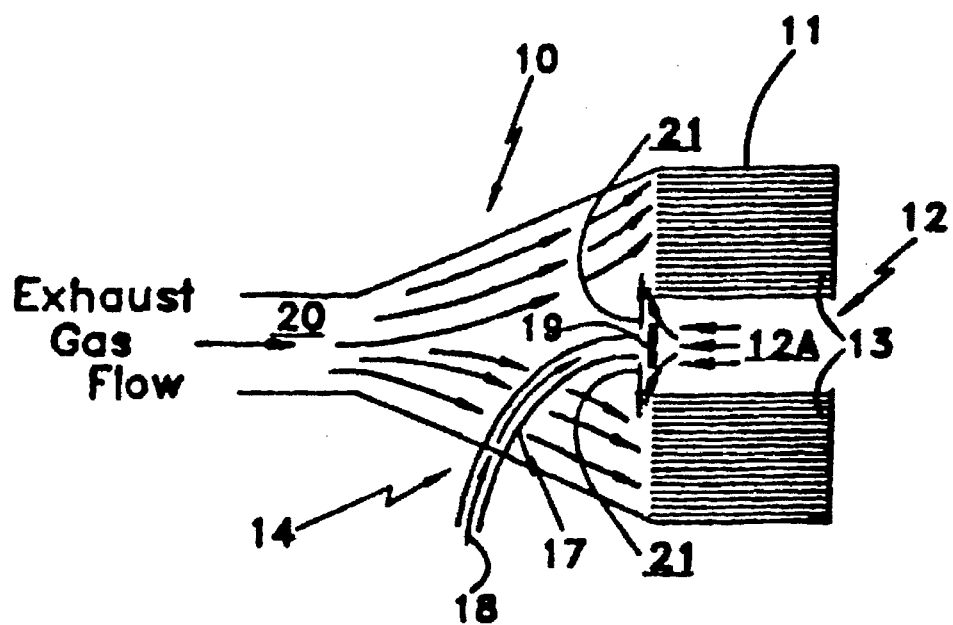
FIG. 4 is a schematic illustrating the direction of exhaust gas flow through an elliptical honeycomb structure and the resultant negative air flow created in the central core area during "diverted" operation.

Negative flow, defined as a flow direction opposite that of the upstream or undiverted exhaust gases, is explained in greater detail in referring to FIGS. 3 and 4 wherein depicted are the flow patterns of exhaust gas under undiverted conditions and the flow pattern of exhaust gases and diversion fluid under diverted conditions.

FIG. 3 schematically illustrates the flow pattern of the exhaust gas under diverter-off conditions; in general, the undiverted exhaust gas which enters the housing 10 flows mostly through the low flow resistance or central hole region, bypassing the peripheral surfaces 13 of the honeycomb substrate. In other words, as a result of standard fluid dynamics, the exhaust gases tend to flow through the low flow resistance or substantially unobstructed flow region 12, centrally positioned in this embodiment, of the honeycomb structure 11 at a higher volume than through the peripheral regions 13.

FIG. 4 illustrates the flow pattern of the exhaust gases which result during diverter-on conditions. In general, exhaust gases flowing from an engine enter the housing 10 and continue towards the honeycomb structure 11 whereupon the fluidics apparatus 14, located proximate to the inlet of the central flow region 12, functions to divert the exhaust gases. The operation of the fluidics apparatus 14 specifically involves introducing into the housing 10 and directing towards, and into contact with, a diverter body 19, a diversion fluid 18, via a diversion fluid conduit 17; preferably, the diverter body comprising either a round or elliptical flat plate. In other words, radially diverting the fluid into the path of the exhaust gas by imparting a flow component to the diversion fluid 18 which is transverse to the flow direction of the exhaust gas 20 entering the housing. This diversion, or change in flow pattern, of the diversion air essentially results in the formation of a fluid shield 21 in front of the central flow region 12 of the honeycomb structure as well as the creation of a negative flow zone 12A in the first region 12—a flow direction opposite that of the upstream or undiverted exhaust gas flow 20. The negative flow zone 12A and the diverted diversion air combine to shield and redirect a portion of the exhaust gases away from the first or central flow region 12 and toward the second or peripheral flow region 13. It should be noted that the zone of negative flow 12 A may consist of diversion air as well recirculated exhaust gas which has passed through the honeycomb structure and has been drawn back into first region's 12 outlet end.

It is essential to note that the actual configuration of the fluidics apparatus, influences greatly whether the desired negative flow condition is obtained in the substantially unobstructed or low flow resistance region. In other words, just placing a fluidics apparatus, i.e., a source of diversion fluid, conduit for delivering the diversion fluid and a diverter body, which results in some type of exhaust gas diversion does not ensure that the exhaust gas flow will be diverted such that the negative flow zone is created. Stated another way, the proper combination of exhaust flow rate, diversion fluid flow rate, honeycomb size, cell density, low flow resistance region size, diverter body dimensions, and position of the diverter body relative to the honeycomb frontal surface are necessary to achieve the desired negative flow. It is contemplated that for each exhaust system designed, the proper combination must be determined on an empirical basis to achieve the desirable negative flow characteristic.

It will be appreciated that although the fluidics apparatus should be configured to obtain a negative flow during diverter-on conditions it is essential that a high percentage of exhaust flow passes through the low flow resistance region when the diversion air is off. In other words, the creation of a negative flow during diverter-on conditions can not be achieved at the expense of high flow through the low flow resistance region during diverter-off conditions.

Referring now specifically to the size of the diverter body, assuming a flat plate-type diverter body, preferably the diverter body plate area should be approximately between 20–50% of the honeycomb substrates low flow resistance frontal area to produce the desirable negative flow; for exhaust flow rates of up to 40 cfpm. If the diverter body plate area is below 20% of the frontal area it will not consistently produce a negative flow in the low flow resistance region; particularly at the higher exhaust flow rates approaching 40–50 cfpm. Diverter body plate areas above 50% of the frontal area likely will block too much of the exhaust flow through the low flow resistance region during diverter-off conditions.

Reiterating, larger diverter plates tend to create a negative flow during diverter-on conditions but they block the flow through the hole during diverter-off conditions. On the other hand, low resistance flow or hole regions with a larger frontal area allow better flow through the hole during diverter-on conditions but make it more difficult to restrict the flow through the low resistance flow or hole regions (i.e., create a negative flow) during diverter-on conditions. Therefore, the best fluidics apparatus configuration will be a diverter body plate area to low flow resistance frontal area ratio which results in a diverter-on negative flow and diverter-off flow through the low-flow resistance region of 50% or greater of the total exhaust flow.

While not intending to be limited by theory, this negative flow appears to result from a swirl pattern created by the high velocity diversion fluid directed into the diverter body. This swift apparently creates a low pressure area in the center of the diverter body which apparently can induce negative flow in the low flow resistance region. As indicated above, negative flow can be lost if the honeycomb is positioned too close or too far away from the diverter body, and applying the aforementioned theory, it is theorized that this may be due to the fact that the low pressure area of the swirl caused by the diverter body has a limited spatial extent at the diversion fluid flows and simulated exhaust flows utilized herein.

It is also theorized that the creation of the negative flow may be due, in part to a "momentum" affect. Specifically, as explained above, the diversion fluid, after contacting the diverter body, is flowing at approximately a right angle to the exhaust flow; i.e., the aforementioned transverse flow component. Because the diversion fluid is exiting the diversion fluid conduit through a thin (~1 mm in the embodiments illustrated by the Examples) slot formed by the conduit outlet and the diverter body, it is moving at high velocity relative to the exhaust gas and therefore, the momentum of the diversion fluid is transferred, in part, to the exhaust flow, thereby diverting it, in part, from the low flow resistance or center hole region. Furthermore, the diversion fluid also transfers momentum to the fluid (gas) which is located behind and on the downstream side of diverter body proximate to the low flow resistance region. This momentum transfer carries the fluid (gas), along with the diverter fluid, in the aforementioned radial direction, away from the back of the diverter plate. It is thought that this momentum transfer creates a flow pattern, that under some conditions, induces a lowering of the pressure near the back of the diverter body which, in turn, results in the negative flow when the low flow resistance in the honeycomb is positioned proximate to the back of diverter body.

In one embodiment, the honeycomb structure utilized in this exhaust system is a variable cell honeycomb structure having a first group of cells and a second group of cells whose cell sizes are smaller than the first group of cells. In another embodiment the honeycomb structure is a substantially cellular structure having an open core region running longitudinally parallel between the inlet and outlet ends of the structure and a peripheral region adjacent the open core, the peripheral region having a plurality of cells running longitudinally, and preferably parallel between the inlet and the outlet ends of the structure.

Another embodiment comprises the honeycomb structure centrally disposed in the housing, having a frontal area, wherein said first region comprises a central open core running longitudinally parallel between the inlet and outlet ends of the structure and the second region comprises a peripheral cellular structure characterized by a plurality of cells running longitudinally and preferably parallel between the inlet and the outlet ends of the structure; preferably, the central open core occupying an area in the range of 0.5 to 50% of the frontal area of the honeycomb structure.

One final embodiment of honeycomb structure comprises a variable cell extruded honeycomb structure having a first central region and a second peripheral region surrounding said first region wherein cells in the first region are larger than the cells in the second region.

Figure 5:
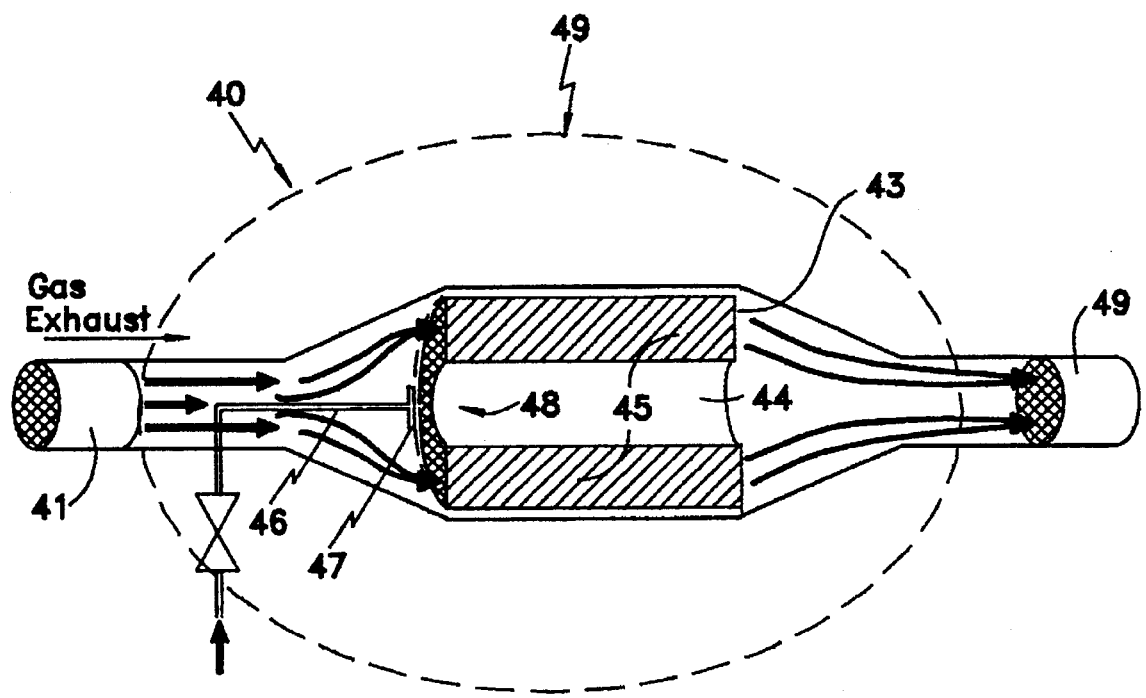
FIG. 5 is a sectional (longitudinal) view of one embodiment of the invention wherein the inventive exhaust system is incorporated into an overall exhaust system in which exhaust gas flows from the engine to a main catalyst, through the diverter exhaust system, and thereafter through a burn-off catalyst.

It is contemplated that this fluidics apparatus described above and shown in examples below has utility as part of an overall in-line exhaust system as disclosed in the aforementioned Hertl et al. reference, i.e., the honeycomb substrate disclosed hereinabove comprises a molecular sieve or hydrocarbon adsorber. Specifically, referring now to FIG. 5, this in-line exhaust system 40 includes the following: (1) a main catalytic converter 41 having a light-off temperature disposed downstream from an engine; (2) a burn-off catalyst 42 disposed downstream from the main catalytic converter 41, such that an exhaust stream is formed connecting the engine, the main catalytic converter and the burn-off catalyst; and (3) the inventive exhaust system 42 described herein including a honeycomb structure 43 comprised of a molecular sieve or adsorber. More specifically, the honeycomb structure 43, comprised of a molecular sieve structure, possesses an inlet and outlet end, is located in the exhaust stream between the main catalytic converter 41 and the burn-off catalyst 42, and exhibits a desorption temperature. Additionally, the molecular sieve/honeycomb structure 43 includes a first substantially unobstructed flow region 44, and a second more obstructed flow region 45 adjacent the first region, the first region being disposed in the exhaust stream to provide a substantially unobstructed flow path for exhaust gases in the exhaust stream from the engine to the burn-off catalyst. Lastly, this exhaust system comprises a diversion air conduit 46 and a diverter body 47 positioned proximate to the center of the first flow region 44 for diverting the exhaust gases away from the first region into the second region 45 to adsorb hydrocarbons while the second region 45 is below the molecular sieve's desorption temperature; the diverter 47 and diversion air 46 combining to form a negative flow zone 48 within the first flow region 44.

A "molecular sieve" as used herein refers to crystalline substances or structures having pore sizes suitable for adsorbing molecules. The term is generally used to describe a class of materials that exhibit selective absorption properties. To be a molecular sieve, as disclosed herein the material must separate components of a mixture on the basis of molecular size and shape differences. Such materials include silicates, the metallosilicates, metalloaluminates, the $AlPO_4$s, silico- and metalloaluminophosphates, zeolites and others described in R. Szostak, *Molecular Sieves: Principles of Synthesis and Identification*, pages 2–6 (Van Nostrand Reinhold Catalysis Series, 1989). Furthermore, the terms "adsorber" and "adsorption" as used herein are intended to encompass both adsorption and absorption as these terms are generally known to persons skilled in the art and as defined in *Webster's Ninth New Collegiate Dictionary* (1985); it is contemplated that both processes of adsorption and absorption occur in the molecular sieve structure of the invention.

If the honeycomb substrate comprises a molecular sieve structure, it preferably comprises zeolites supported on the honeycomb structure, with the zeolites selected from the group consisting of ZSM-5, USY, Mordenite, Beta zeolites, activated carbon and combinations of these. On the other hand, the molecular sieve structure may comprise an extruded zeolite selected from the same zeolite group.

Although one embodiment of this exhaust system is as an adsorber-type system wherein the honeycomb substrate is a molecular sieve or adsorber, it should be noted that the honeycomb structure of the instant exhaust system could, simply be a catalyst structure. Preferably, a three-way catalyst, a light-off catalyst, an electrically heated catalyst, an oxidation catalyst or combinations thereof.

The present invention is hereinafter described in more detail by way of Examples. However, the present invention is not restricted to these examples. In other words, the following non-limiting examples are presented to more fully illustrate the invention.

EXAMPLES

Examples 1–4

A simulated exhaust system resembling the system as depicted in FIGS. 1–3 was used to illustrate the effectiveness of the negative flow-inducing fluidics apparatus. Specifically, the exhaust system was comprised of the following: (1) a cylindrical 400 cell per square inch (cpsi) honeycomb structure exhibiting a 4.66 in. (11.84 cm) diameter and a 1.5 in. (3.81 cm) diameter central hole region; and, (2) a fluidics apparatus comprised of a circular diameter flat-plate diverter body of varying diameter (D) and thereby exhibiting varying diverter body to center hole region area ratios ($A_d/A_h$)—positioned proximate to the honeycomb substrate's hole region at varying distances (L) from the inlet face of the honeycomb and 0.039 in. (1 mm) downstream of a diversion fluid outlet—an air supply tube. In other words, a 1 mm slot was formed between the diverter body and the diverter conduit opening for passage of diversion fluid, air in this example.

Figure 6:
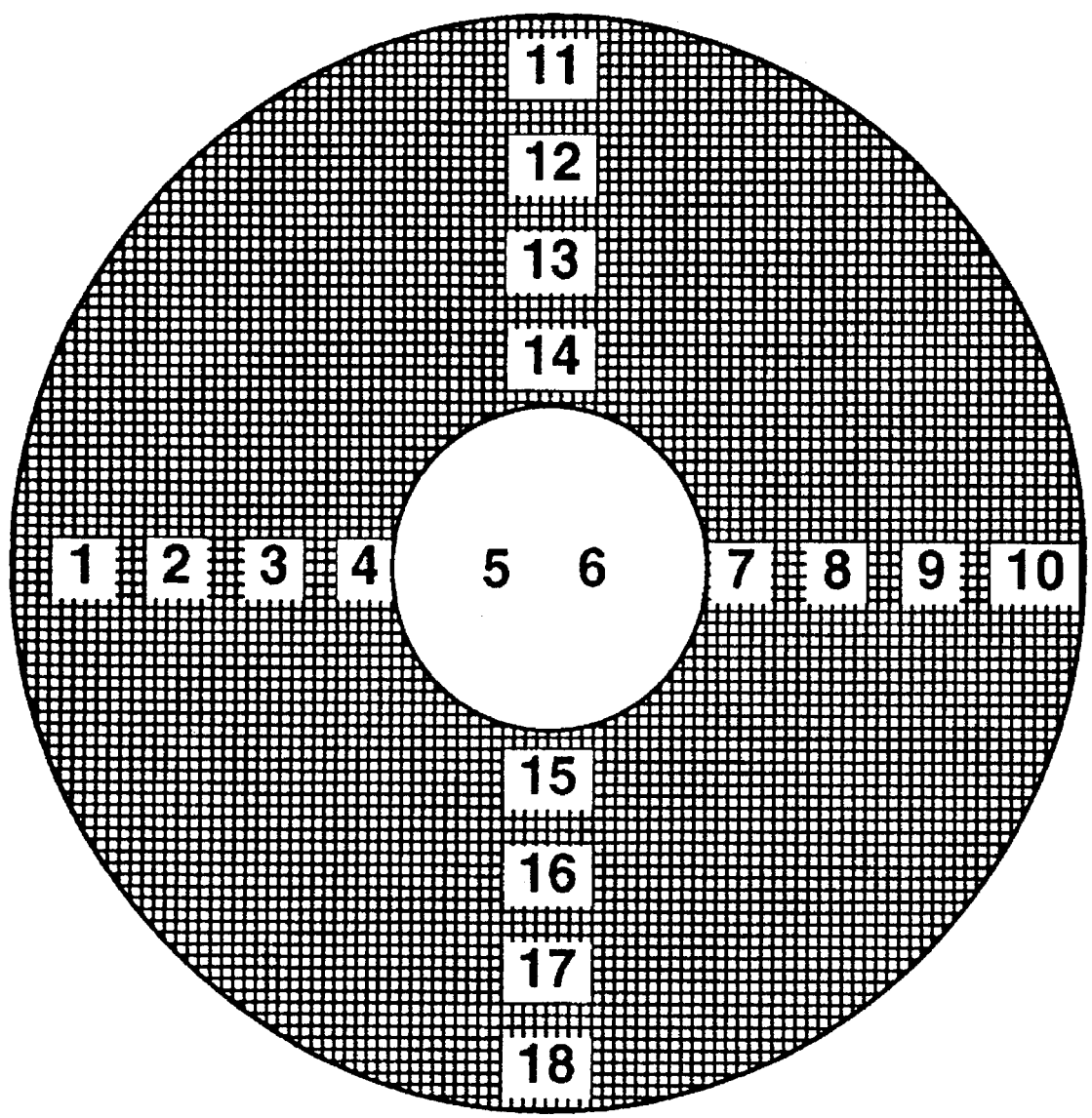
FIG. 6 is an illustration of the linear flow measurement positions at the outlet end of a round honeycomb substrate.

Air, simulating exhaust flow, was passed into the housing and directed at the honeycomb substrate at volumetric flow rates of about 20 and 40 cubic feet per minute (cfpm). The linear flow rate, in feet per minute (fpm) of the honeycomb substrate was measured at several positions, horizontal positions and vertical positions 1–18 indicated in FIG. 6, on the downstream face of the honeycomb structure utilizing a hand held Omegaflo model 610 Anemometer. These measurements were averaged to obtain the average linear flow velocity in the central region (Cent. Flow V.) and in the peripheral region (Periph. Flow V.) and recorded, along D, $A_d/A_h$, L from above, in Table I.

An examination of Table I reveals that an undiverted simulated exhaust flow of 20 cfpm supplied to fluidics apparatus system example no. 1 resulted in a central hole region average linear flow velocity of about 1400 fpm, while the same 20 cfpm simulated exhaust flow resulted in a negative flow in the central hole region of about 800 fpm when operated during diversion conditions—approximately 10.5 cfpm of diverter air directed at the diverter. However, when the simulated exhaust gas supply was increased to 40 cfpm the diverted/undiverted central hole region average linear flow velocities were 2350 and 350 fpm respectively; i.e., no resultant negative flow zone. It is however, contemplated that increasing the diversion fluid supply flow rate, i.e., a diversion air flow rate of above 10.5 cfpm, would likely result in achieving a negative flow for the higher 40 cfpm simulated exhaust supply.

TABLE I

| Ex. No. | Exhaust/ Diverter | D (in/cm) | $A_d/A_h$ | L (in/mm) | Center Flow V. (fpm) | Periph. Flow V (fpm) |
|---|---|---|---|---|---|---|
| 1 | 20 cfpm/No | 0.5/1.27 | 0.11 | 0.25/6.35 | 1400 | 46.9 |
|   | 20 cfpm/Yes |  |  |  | −800 | 554.4 |
|   | 40 cfpm/No |  |  |  | 2350 | 129.4 |
|   | 40 cfpm/Yes |  |  |  | 350 | 503.8 |
| 2 | 40 cfpm/No | 0.75/1.9 | 0.25 | 0.24/6 | 2100 | 132 |
|   | 40 cfpm/Yes |  |  |  | −550 | 733 |
| 3 | 40 cfpm/No | 0.75/1.9 | 0.25 | 0.35/9 | 2200 | 140 |
|   | 40 cfpm/Yes |  |  |  | −350 | 872 |
| 4 | 20 cfpm/No | 1.1/2.8 | 0.54 | 0.24/6 | 1100 | 52 |
|   | 20 cfpm/Yes |  |  |  | −400 | 374 |
|   | 40 cfpm/No |  |  |  | 2000 | 179 |
|   | 40 cfpm/Yes |  |  |  | 170 | 631 |

Example 5

Figure 7:
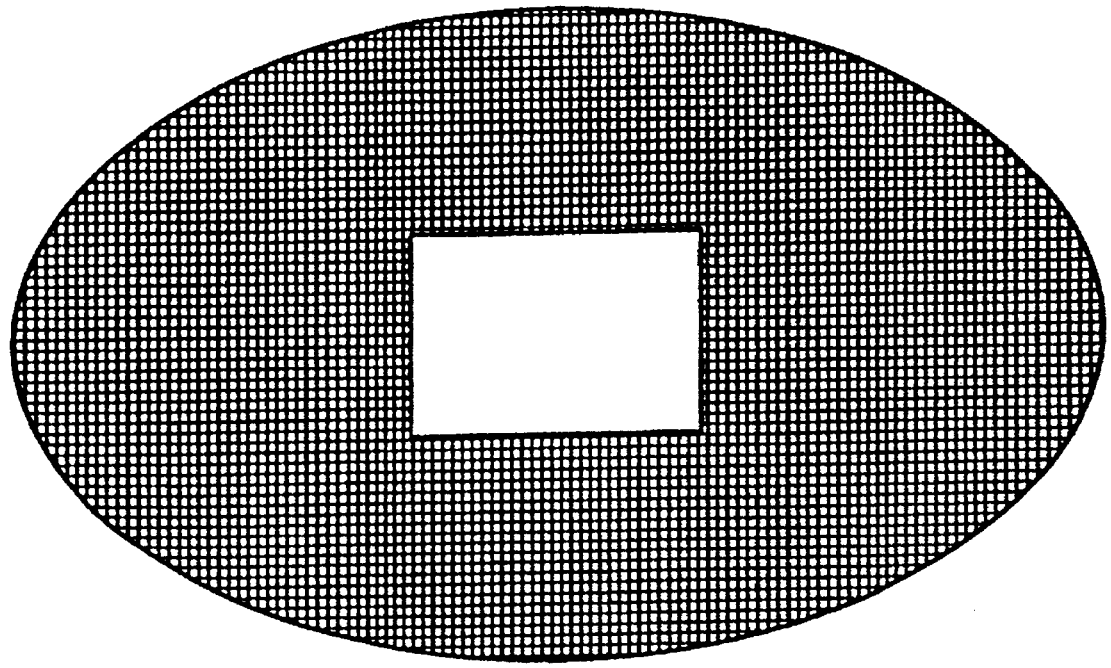
FIG. 7 is an embodiment of an elliptical honeycomb, having a rectangular center hole, useful in the inventive exhaust system.

A simulated exhaust system resembling the system depicted in FIGS. 1–3, but with an elliptical honeycomb as depicted in FIG. 7, was used to further illustrate the effectiveness of negative flow-inducing fluidics apparatus. Specifically, the exhaust system was comprised of the following: (1) a 400 cell per square inch (cpsi) elliptical honeycomb structure exhibiting a long and short axis of 5.82 in. (14.8 cm) and 3.3 in. (8.4 cm), respectively, and a rectangular center hole region of 1.89×1.38 in. axis respectively; (4.8×3.5 cm) and, (2) a fluidics apparatus comprised of an elliptical plate diverter body exhibiting dimensions of 1.42×0.55 in. (3.6×1.4 cm) positioned 0.039 in. (1 mm), in front a diversion air outlet—again, an air supply tube. Additionally, the diverter body was positioned whereby the respective long axis of the central hole of the honeycomb and elliptical plate diverter body were parallel.

Figure 9:
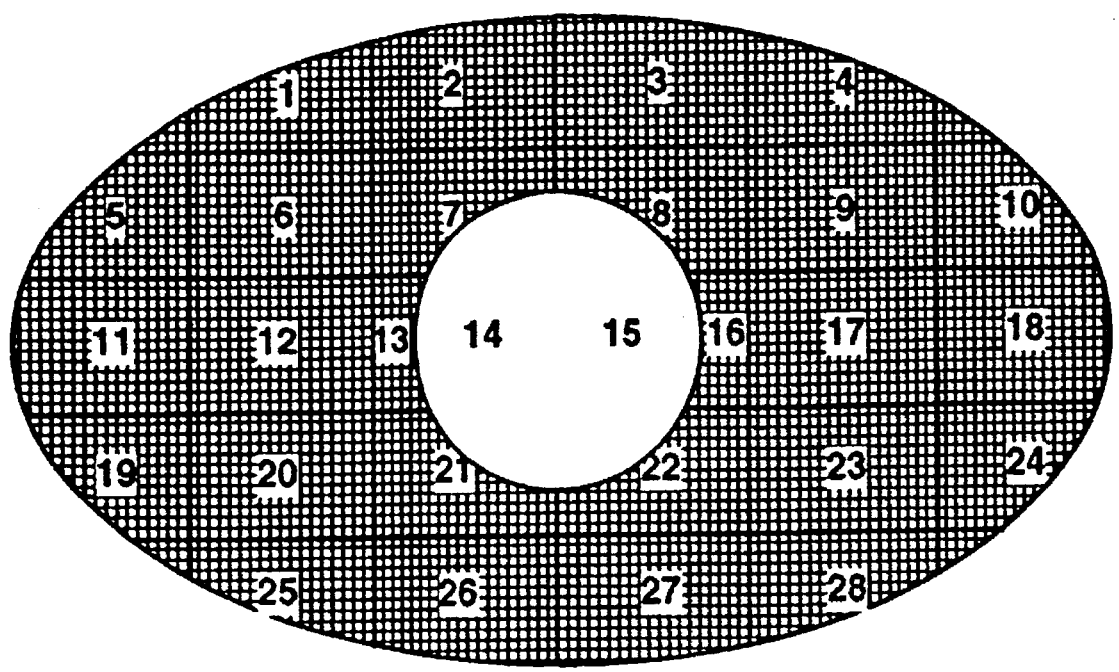
FIG. 9 is an illustration of the linear flow measurement positions at the outlet end of an elliptical honeycomb substrate.
Figure 10:
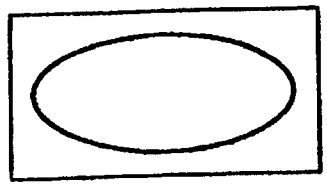
FIGS. 10–16 are a series of illustrations of various diverter body shapes usable in the inventive fluidic apparatus.
Figure 11:
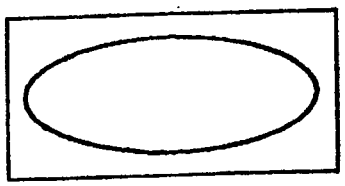
Figure 12:
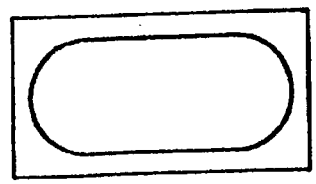
Figure 13:
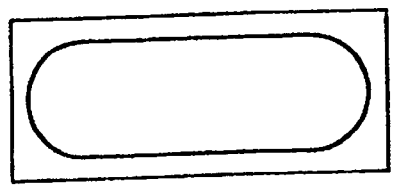
Figure 14:
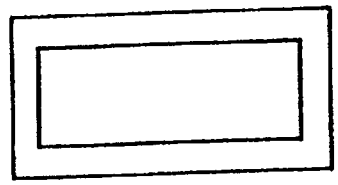
Figure 15:
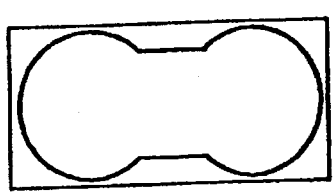
Figure 16:
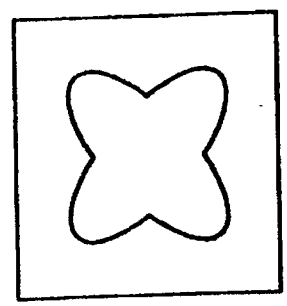

Simulated exhaust gas flows and diversion fluid supply conditions (air at 10 cfpm) as used in Example 1 were again utilized. Linear flow measurements for this elliptical honeycomb utilizing this fluidics apparatus containing an elliptical plate diverter body were measured, at several positions, designated positions 1–28 as indicated in FIG. 9, calculated as in Example 1 and recorded in Table II.

An examination of Table II reveals, for simulated exhaust gas supplies of 20 and 40 cfpm, an undiverted average linear flow rate in the central hole of about 950 and 1500 fpm, respectively, and a diverted average linear flow in the central hole of about (−) 635 and 325 fpm, respectively; creation of a negative flow zone for the 20 cfpm and not for the 40 cfpm simulated exhaust supply.

TABLE II

| Exhaust/ Diverter | Cent. Flow V. (fpm) | Periph. Flow V. (fpm) | Fraction of Total Flow through Center |
|---|---|---|---|
| 20 cfpm/Off | 950 | 47.4 | 0.85 |
| 20 cfpm/On | −635 | 563.5 | −0.51 |
| 40 cfpm/Off | 1500 | 150 | 0.75 |
| 40 cfpm/On | 325 | 664.6 | 0.13 |

Example 6

Figure 8:
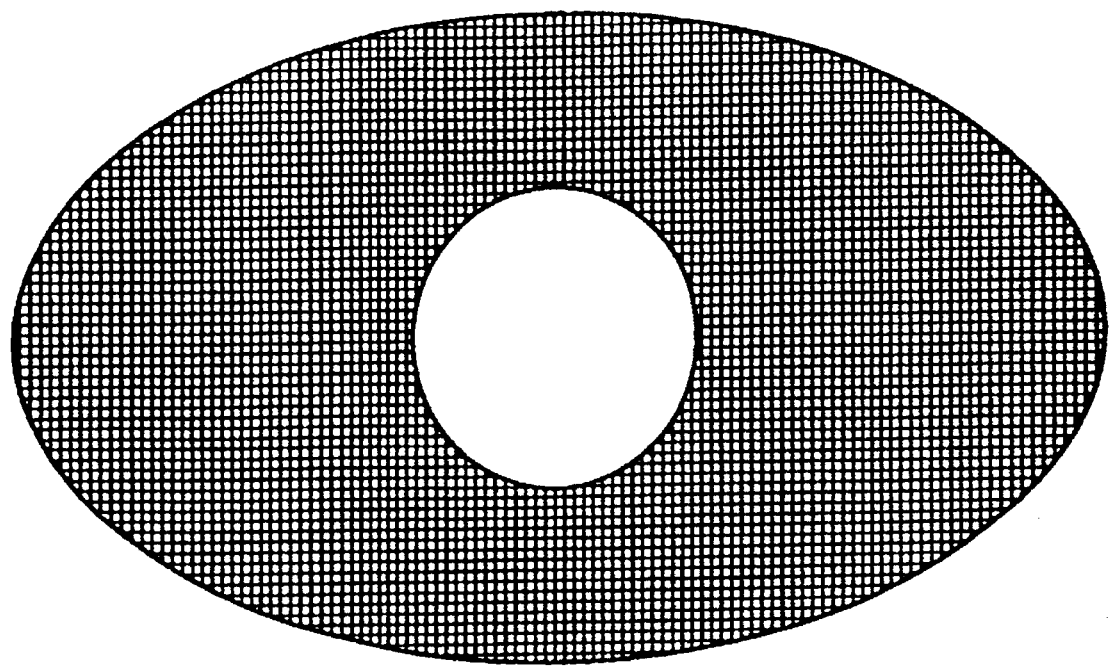
FIG. 8 is an embodiment of an elliptical honeycomb, having a round center hole, useful in the inventive exhaust system.

The same exhaust system as utilized in Example 5, but with a round center hole region of 1.89 in (4.8 cm) was subjected to the same simulated undiverted and diverted exhaust flow conditions; as depicted in FIG. 8. The linear flow measurements, measured and calculated above, are reported in Table III.

An examination of Table III reports that the average linear flow rate in the central hole for the 20 cfpm simulated exhaust, without and with diversion air, was about 1175 and (−) 737.5 fpm, respectively, and the average linear flow rate in the central hole for the 40 cfpm simulated, undiverted and diverted was 1650 and 500 fpm respectively. It should be noted that again, the diverter system is such that it results in a negative flow in the lower 20 cfpm simulated exhaust flow but not in the higher 40 cfpm exhaust flow.

TABLE III

| Exhaust/Diverter | Cent. Flow V. (fpm) | Periph. Flow V. (fpm) | Fraction of Total Flow through Center |
|---|---|---|---|
| 20 cfpm/Off | 1175 | 50.0 | 0.88 |
| 20 cfpm/On | −737.5 | 540.6 | −0.80 |
| 40 cfpm/Off | 1650 | 145.5 | 0.79 |
| 40 cfpm/On | 500 | 526.2 | 0.24 |

Examples 7–11

Table IV reports the average linear flow rates, measured and calculated as above, exhibited by an exhaust system similar to that as described in Example 5 subjected to an simulated exhaust flow rates of 20 and 40 cfpm, diverted and undiverted and utilizing various fluidics apparatus configurations; consistently shaped and sized elliptical flat-plate diverter bodies (3.6×1.4 cm), varying diverter body to substrate distances (L), center hole shape and size, diverter body to substrate hole area ratios ($A_d/A_h$) and substrate hole to substrate frontal area ratios ($A_h/A_f$).

An examination of Table IV, further supports the observation that a proper configuration for each fluidics apparatus is essential in achieving the desired negative flow. For example, fluidics apparatus systems 7–9 all produced negative flows at both simulated exhaust flows while fluidics apparatus 10 and 11 produced negative flows at the lower 20 cfpm flow rate but not at the higher simulated exhaust flow rate of 40 cfpm. In other words, the fluidics apparatus 10 and 11 were not configured to produce a negative flow zone in the central flow region at the higher simulated exhaust flow rate of 40 cfpm.

TABLE IV

| Ex. No. | Exhaust/ Divers | $A_d/A_h$ | $A_h/A_f$ | L (in/mm) | Cent Flow V. (fpm) | Periph. Flow V. (fpm) |
|---|---|---|---|---|---|---|
| 7 | 20 cfpm/N | 0.38 | 0.11 | 0.315/8 | 1250 | 83 |
|  | 20 cfpm/Y |  |  |  | −938 | 539 |
|  | 40 cfpm/N |  |  |  | 1775 | 232 |
|  | 40 cfpm/Y |  |  |  | −365 | 808 |
| 8 | 20 cfpm/N | 0.33 | 0.12 | 0.393/10 | 1062 | 72 |
|  | 20 cfpm/Y |  |  |  | −560 | 466 |
|  | 40 cfpm/N |  |  |  | 1775 | 218 |
|  | 40 cfpm/Y |  |  |  | −135 | 695 |
| 9 | 20 cfpm/N | 0.29 | 0.14 | 0.276/7 | 1175 | 63 |
|  | 20 cfpm/Y |  |  |  | −795 | 517 |
|  | 40 cfpm/N |  |  |  | 1575 | 194 |
|  | 40 cfpm/Y |  |  |  | −112 | 711 |
| 10 | 20 cfpm/N | 0.24 | 0.17 | 0.295/7.5 | 738 | 48 |
|  | 20 cfpm/Y |  |  |  | −848 | 546 |
|  | 40 cfpm/N |  |  |  | 1485 | 141 |
|  | 40 cfpm/Y |  |  |  | 225 | 706 |

TABLE IV-continued

| Ex. No. | Exhaust/ Divers | $A_d/A_h$ | $A_h/A_f$ | L (in/mm) | Cent Flow V. (fpm) | Periph. Flow V. (fpm) |
|---|---|---|---|---|---|---|
| 11 | 20 cfpm/N | 0.22 | 0.18 | 0.295/7.5 | 1175 | 50 |
|  | 20 cfpm/Y |  |  |  | −738 | 541 |
|  | 40 cfpm/N |  |  |  | 1650 | 146 |
|  | 40 cfpm/Y |  |  |  | 500 | 526 |

Examples 12–18

Table V reports the average linear flow rates, measured and calculated as above, exhibited by a elliptical honeycomb substrate as described in Example 5 and subjected to an simulated exhaust flow rate of 40 cfpm, both undiverted and utilizing various fluidics apparatus configurations; differently shaped and sized diverter bodies, designated AA–GG, as illustrated in FIGS. 10–16 respectively, varying diverter body to substrate distances (L).

An examination of Table V again confirms the observation, that the configuration of the fluidics apparatus is essential in achieving the desired negative flow. For example, fluidics apparatus 12 and 13, both utilizing and elliptical flat-plate diverter bodies, though with different sizes and positioned different distances from the frontal surface of the substrate (L), produce differing flow results; fluidics apparatus 12 produced the desired negative flow ((−)255 fpm) at the 40 cfpm simulated exhaust flow, while fluidics apparatus 13 did not (220 fpm).

TABLE V

| Ex. No. | Exhaust/ Diverter | Div. body/ Size (in/cm) | L (in/cm) | Center Flow V. (fpm) | Periph. Flow V (fpm) | Fraction of Total Flow in Center |
|---|---|---|---|---|---|---|
| 12 | 40 cfpm/N | AA | 0.354/9 | 1338 | 157 | 0.73 |
|  | 40 cfpm/Y | 1.42 × 0.55 |  | −255 | 861 | −0.11 |
|  |  | 3.6 × 1.4 |  |  |  |  |
| 13 | 40 cfpm/N | BB | 0.315/8 | 1500 | 163 | 0.75 |
|  | 40 cfpm/Y | 1.57 × 0.59 |  | 220 | 839 | 0.08 |
|  |  | 4.0 × 1.5 |  |  |  |  |
| 14 | 40 cfpm/N | CC | 0.335/8.5 | 1600 | 169 | 0.75 |
|  | 40 cfpm/Y | 1.57 × 0.59 |  | 260 | 804 | 0.10 |
|  |  | 4.0 × 1.5 |  |  |  |  |
| 15 | 40 cfpm/N | DD | 0.394/10 | 1500 | 160 | 0.75 |
|  | 40 cfpm/Y | 1.97 × 0.63 |  | 200 | 834 | 0.07 |
|  |  | 5.0 × 1.6 |  |  |  |  |
| 16 | 40 cfpm/N | EE | 0.315/8 | 1375 | 164 | 0.73 |
|  | 40 cfpm/Y | 1.57 × 0.59 |  | −270 | 958 | −0.09 |
|  |  | 4.0 × 1.5 |  |  |  |  |
| 17 | 40 cfpm/N | FF | 0.354/9.5 | 1412 | 159 | 0.74 |
|  | 40 cfpm/Y | 1.57 × 0.79 |  | −250 | 854 | −0.11 |
|  |  | 4.0 × 2.0 |  |  |  |  |
| 18 | 40 cfpm/N | GG | 0.236/6 | 1538 | 182 | 0.73 |
|  | 40 cfpm/Y | 1.38 × 1.38 |  | −525 | 924 | −0.18 |
|  |  | 3.5 × 3.5 |  |  |  |  |

It will be appreciated that the above fluidic configuration Examples utilized only a diversion air flow rate of ~10.5 cfpm, which as the Examples revealed was not always proper to produce the desirable negative flow in the low flow resistance or hole region when the exhaust flow rates were higher (≧40 cfpm); it is contemplated that higher diversion air flow rates would likely correct this.

It will be appreciated from the foregoing description that the present invention has utility in a variety of systems for treating gas or other fluid streams, including any system wherein the handling of gas flows without the use of mechanical valves or other mechanical means of flow control is required. However, the systems of most mediate interest for such use are those involving the treatment of exhaust emissions from engines or other combustion exhaust gas sources. Accordingly, the preceding detailed description of the invention focused principally on such emissions control applications even though the use of the invention is not limited thereto.

Figure 17:
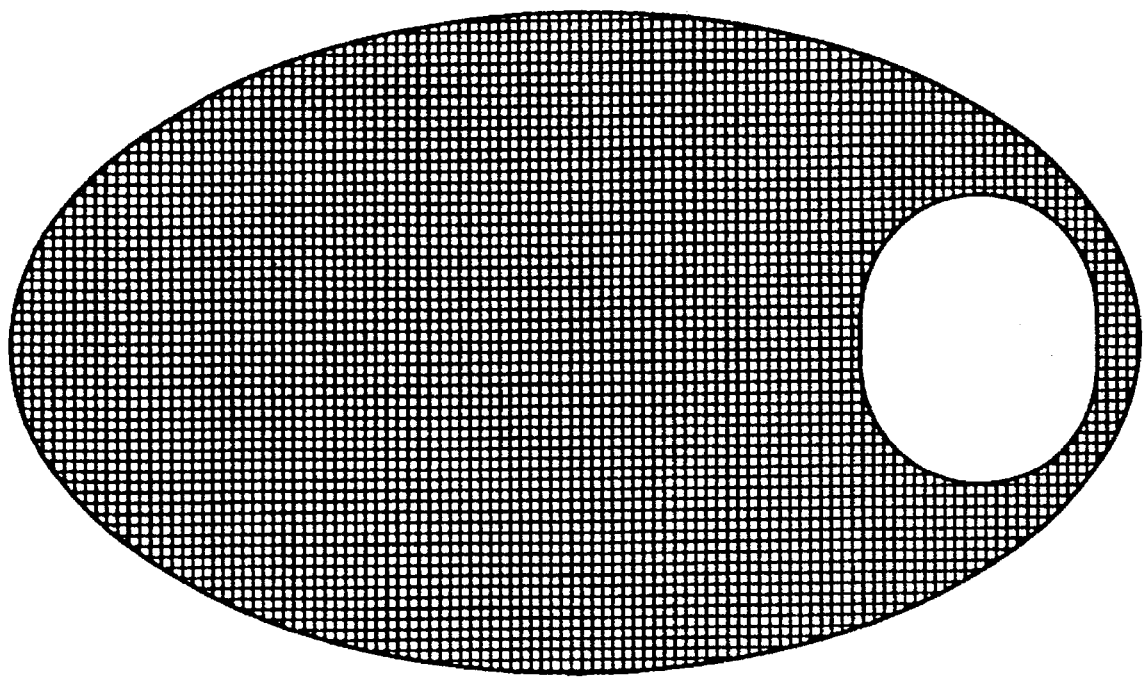
FIG. 17 is another embodiment of an elliptical honeycomb, having a off-center hole, useful in the inventive exhaust system.

Although the invention has been described with respect to the above illustrated description and examples, it may be subjected to various modifications and changes without departing from the scope of the invention. For example, although the examples have utilized only square cell channels, the invention can be extended to a variety of cell shapes for the honeycomb, (triangular, hexagonal, rectangular, flexible cells etc.). Furthermore, although only honeycombs exhibiting central holes have been disclosed, other configurations such as honeycombs possessing non-central holes as depicted in FIG. 17, honeycombs with differing cell sizes for the flow through channel, honeycombs with holes that do not extend fully through the honeycomb and other configurations are possible. Finally, various diverter shapes other than those disclosed above may be utilized, for example round-cornered rectangles.

We claim:

1. An in-line engine exhaust system comprising:
    a honeycomb structure having an inlet and outlet end disposed in a housing and located in an exhaust gas stream downstream from an engine, the honeycomb structure having a first substantially unobstructed flow region, and a second more obstructed flow region adjacent the first region, the first region being disposed to provide a substantially unobstructed flow path for the exhaust gases in the exhaust gas stream; and,
    a fluidic apparatus disposed in the exhaust stream upstream and proximate to the first region for creating a negative flow zone within the first region in a direction opposite that of the exhaust gas flow.

2. The exhaust system of claim 1 wherein the fluidics apparatus includes a diverter body, a diversion fluid source and a conduit possessing an outlet for directing the diversion fluid toward the diverter body.

3. The exhaust system of claim 1 wherein the diverter body is positioned proximate to the center of the first region.

4. The exhaust system of claim 1 wherein the conduit outlet is positioned sufficiently close to the diverter body whereby the diverter body imparts a flow component to the diversion fluid which is transverse to the first region direction.

5. The exhaust system of claim 1 wherein the diverter body comprises a circular flat-plate body.

6. The exhaust system of claim 1 wherein the diverter body comprises a elliptical flat-plate body.

7. The exhaust system of claim 5 or 6 wherein the area of diverter body flat plate is between about 20–50% of the frontal area of the unobstructed flow region.

8. The exhaust system of claim 1, wherein the honeycomb structure comprises one of (1) a variable cell honeycomb structure having a first group of cells and a second group of cells whose cell sizes are smaller than the first group of cells, or (2) a substantially cellular structure having an open core region running longitudinally parallel between the inlet and outlet ends of the structure and a peripheral region adjacent the open core, the peripheral region having a plurality of cells running longitudinally parallel between the inlet and the outlet ends of the structure.

9. The exhaust system of claim 1, wherein the honeycomb structure is centrally disposed in the housing, has a frontal area, wherein said first region comprises a central open core running longitudinally parallel between the inlet and outlet ends of the structure and the second region comprises a peripheral cellular structure characterized by a plurality of cells running longitudinally parallel between the inlet and the outlet ends of the structure.

10. The exhaust system of claim 5, wherein the central open core occupies an area in the range of 0.5 to 50% of the frontal area of the honeycomb structure.

11. The exhaust system of claim 1, wherein the honeycomb structure comprises a variable cell extruded honeycomb structure having a first central region and a second peripheral region surrounding said first region wherein cells in the first region are larger than the cells in the second region.

12. The exhaust system of claim 1, wherein the honeycomb structure is catalyst structure and comprises a three-way catalyst, a light-off catalyst, an electrically heated catalyst, an oxidation catalyst or combinations thereof.

13. The exhaust system of claim 1 wherein the honeycomb structure is a molecular sieve structure exhibiting a desorption temperature.

14. The exhaust system of claim 13 comprises wherein the molecular sieve structure comprises zeolites supported on the honeycomb structure, the zeolites selected from the group consisting of ZSM-5, USY, Mordenite, Beta zeolites, activated carbon and combinations of these.

15. The exhaust system of claim 13 wherein the molecular sieve structure comprises extruded zeolites selected from the group consisting of ZSM-5, USY, Mordenite, Beta zeolites, activated carbon and combinations of these.

16. A method of treating an engine exhaust stream comprising:
    flowing exhaust gases from an engine to a honeycomb structure having an inlet and outlet end disposed in a housing and a first substantially unobstructed flow region, and a second more obstructed flow region adjacent the first region;
    introducing into the housing, while flowing the exhaust gases from the engine to the honeycomb structure, a diversion fluid and imparting a flow component to the diversion fluid which is in direction transverse to the flow of exhaust gases, thereby creating a negative flow zone in the first region.

17. The method of claim 16 wherein creating of the negative flow involves diverting the diversion fluid into the path of the exhaust gas to produce a flow pattern which results in the formation of the negative flow zone.

18. The method of claim 16 wherein the diverting of the diversion fluid into the path of the exhaust gas and the creating of the negative flow region result in the diverting of a portion of the exhaust gases away from the first region and toward the second region.

19. The method of claim 18 wherein the diversion fluid is diverted in a radial direction.

* * * * *